United States Patent

[11] 3,617,156

| [72] | Inventors | Otto Schiele<br>Neustadt;<br>Adolf Kratzer, Nurnberg; Helmut Zilling, Nurnberg, all of Germany |
|---|---|---|
| [21] | Appl. No. | 885,730 |
| [22] | Filed | Dec. 17, 1969 |
| [45] | Patented | Nov. 2, 1971 |
| [73] | Assignee | Klein, Schanzlin & Becker Aktiengesellschaft<br>Frankenthal Pfalz, Germany |
| [32] | Priority | Dec. 17, 1968 |
| [33] | | Germany |
| [31] | | P 18 15 088.4 |

[54] COUNTERBALANCED HYDRAULIC MOTOR AND PUMP UNIT
11 Claims, 1 Drawing Fig.

[52] U.S. Cl. .................................................... 417/365, 415/104, 417/423

[51] Int. Cl. ...................................................... F04b 35/00, F01d 3/00, F04b 17/00
[50] Field of Search ........................................... 417/365, 366, 372, 423, 424; 415/100, 104, 105, 106, 107

[56] References Cited
UNITED STATES PATENTS

| 2,809,590 | 10/1957 | Brown .......................... | 417/357 |
| 3,031,973 | 5/1962 | Kramer ......................... | 415/104 X |
| 3,413,925 | 12/1968 | Campolong .................. | 417/365 X |

*Primary Examiner*—Robert M. Walker
*Attorney*—Michael S. Striker

ABSTRACT: A motor and pump unit has a motor rotor and a pump rotor connected by a shaft whose end portions pass through openings in the end walls of a casing. OUtside of the end walls, the shaft has flanges forming axial gaps with the end walls so that pressure fluid flowing through the gaps counterbalances the motor rotor.

PATENTED NOV 2 1971　　3,617,156
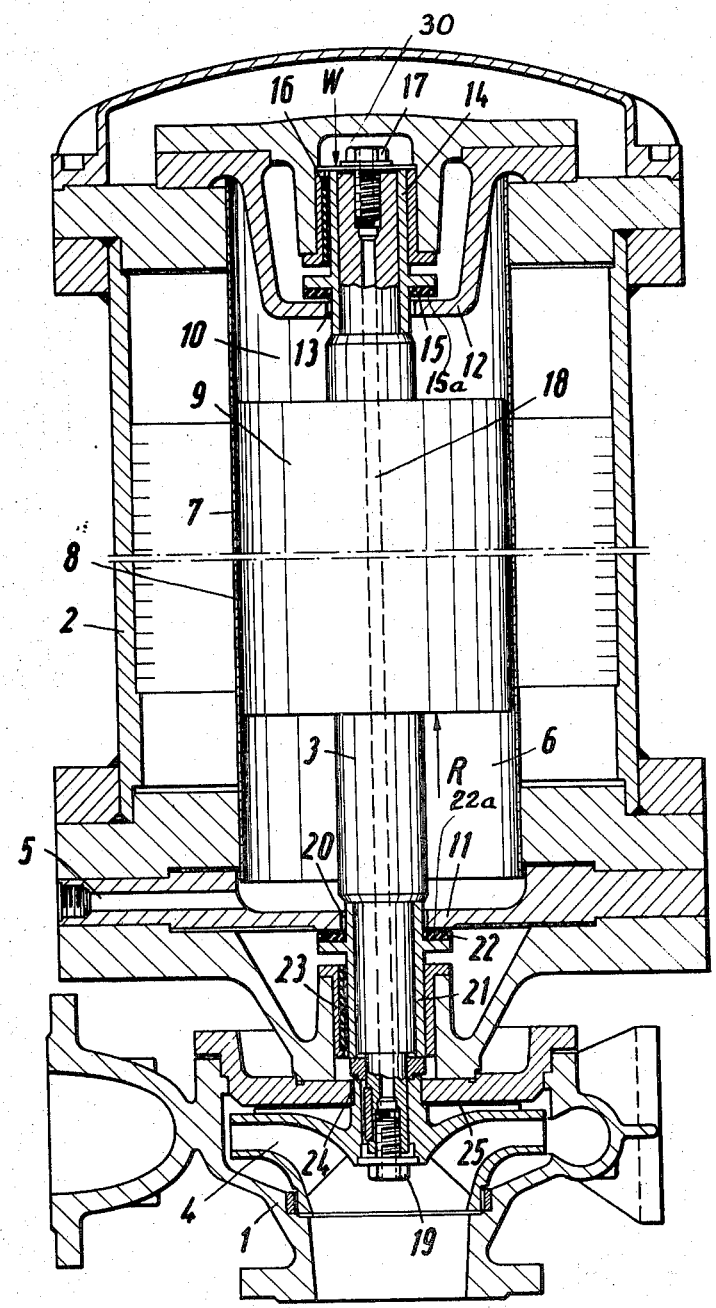
Inventor:
OTTO SCHIELE
ADOLF KRATZER
HELMUT ZIGLINS

COUNTERBALANCED HYDRAULIC MOTOR AND PUMP UNIT

BACKGROUND OF THE INVENTION

The German Pat. No. 1,257,581 discloses a hydraulic unit formed by a canned tube motor and a centrifugal pump in which the rotor is mounted with axial play and serves for counterbalancing axial forces. The arrangement is such that the rotor is displaced to abut a thrust bearing when the axial forces vary, and also when the pump is started, so that the thrust bearings are subjected to substantial forces. A gradual oscillation into a stable counterbalanced position in which the thrust bearings are not subjected to pressure, is not possible.

SUMMARY OF THE INVENTION

It is one object of the invention to overcome the disadvantages of prior art motor and pump units, and to provide a unit in which the axial pressure produced on the motor rotor and shaft by the pump, is counterbalanced.

Another object of the invention is to prevent undesirable friction in the bearings supporting the shaft of the motor and pump unit.

Another object of the invention is to provide a motor and pump unit with a counterbalanced motor rotor and shaft which is of simple construction, and can be inexpensively manufactured.

With these objects in view, the present invention provides rotary bearing parts outside of the interior of the rotor casing, and cooperating with end walls of the same to form annular axial gaps through which pressure fluid flows. It is particularly advantageous, if the end walls have circular rims around the shaft, forming with the same throttles through which the pressure fluid flows before entering the axial gaps of the thrust bearings.

One embodiment of the invention comprises a pump having a pump rotor; a motor, preferably a slotted tube motor, including a motor rotor, a shaft fixedly connecting the pump rotor with the motor rotor and having two transverse bearing flanges, and a stator casing surrounding the motor rotor and having two end walls located on opposite sides of the motor rotor and formed with axially aligned openings through which the shaft passes so that circumferential gaps are formed.

The bearing flanges are located outside of the end walls, respectively, and form with the same, two annular axial gaps whose axial thicknesses simultaneously increase and decrease, respectively, when the motor rotor and shaft move in axial direction.

Conduit means supply pressure fluid from the pump into the interior of the stator casing so that the fluid passes through the circumferential gaps and flows through the axial gaps for counterbalancing axial pressures acting on the motor rotor and shaft, and then returns to the pump.

The novel features which are considered as characteristic for the invention are set forth in particular in the appended claims. The invention itself, however, both as to its construction and its method of operation, together with additional objects and advantages thereof, will be best understood from the following description of specified embodiments when read in connection with the accompanying drawings.

BRIEF DESCRIPTION OF THE DRAWING

The single figure of the drawing is an axial sectional view illustrating a motor and pump unit according to a preferred embodiment of the invention.

DESCRIPTION OF THE PREFERRED EMBODIMENTS

A centrifugal pump 1, and the rotor 9 of a motor 2 are fixedly mounted on a common shaft 3. Due to distribution of forces on the pump rotor 4, an axial force is produced.

For cooling and lubricating the motor, a part of the pressure fluid produced by the pump 1 is guided through a conduit, not shown, and through a conduit 5 into a space 6 in the stator casing 8 on one side of the motor rotor 9. The interior of the casing is divided by rotor 9 which forms a connecting gap 7 with the inner surface of a stator portion carried by stator casing 8. Fluid flowing from the space 6 through the connecting gap 7 enters the other space 10 in the interior of stator casing 8.

The end walls 11 and 12 of the stator casing 8 are provided with openings through which end portions of shaft 3 pass. The diameters of the shaft end portions and of the openings are selected so that circumferential throttling gaps 20 and 13 are formed. Outside of the central portions of the end walls 11 and 12, shaft 3 carries sleeves 14 and 21 provided with flanges 22 and 15 which are spaced from annular portions of the outer surfaces of end walls 11 and 12 by annular axial gaps 22a and 15a.

The fluid flowing through connecting gap 7 and space 10, flows through the circumferential gap 13 and through the axial gap 15a, through a bearing 16, in which sleeve 14 and shaft 3 are mounted for rotation, and enters a pressure chamber 30. A bore in a screw 17, an axially extending conduit 18 in shaft 3, and a bore in a screw 19 permit the return of the pressure fluid from the pressure chamber 30 to the suction inlet of the pump.

The part of the pressure fluid entering space 6 from conduit 5, flows through the circumferential gap 20, the annular axial gap 22a, through the bearing 23, and a throttling gap 24 into the chamber 25 of centrifugal pump 1. The diameters of the openings which form the circumferential gaps 13 and 20, are selected in relation to the diameter of sleeves 14 and 21 so that the radial thicknesses of gaps 13 and 20 are small, and gaps 13 and 20 throttle the flow of fluid.

During operation, rotor 9 and shaft 3 are in a central position in which the axial gaps 15a and 22a have the same axial thickness so that an axial force is created which is the resultant of the pressure forces W and R. The pressure component R is created by the pressure differential between chambers 6 and 10 since the pressure fluid in the same acts on the end faces of rotor 9. The pressure component W created by pressure fluid in pressure chamber 30 and acting on the end face of shaft 3, urges shaft 3 and rotor 9 toward the pump.

Pressure component W is smaller than pressure component R since not only the surfaces on which the pressures act, respectively, are different, but also due to the fact that the pressure component W acting on the end face of the shaft is reduced due to the throttling effect of the circumferential gap 13. The bearings 16 and 23 are symmetrically constructed, and have a negligible influence on the axial forces.

Assuming that the rotor 9 and shaft 3 move toward the pump 1, the flow of cooling fluid through the annular axial gap 15a is reduced by the throttle effect of gap 15a whose axial thickness is reduced due to the displacement of shaft 3 with flange 15. This has little effect on the pressure component R which urges rotor 9 and shaft 3 away from the pump, but the pressure component W which acts in the pressure chamber 30 on the end face of shaft 3 becomes gradually smaller when gap 15a is reduced and its throttling effect increased due to the movement of shaft 3 toward the pump. In the axial bearing 15, 15a, 12, an additional axial force component is created which acts on the rotating flange 15, and this additional axial force increases very rapidly as the rotor 9 and shaft 3 move with flange 15 in the direction toward the pump. The force increase is reciprocally proportional to the third power of the axial thickness of gap 15a. The additional axial force is added to the pressure forces W and R so that the relieving force acting in the direction of the pressure R away from the pump is greatly increased when the rotor and shaft 3 further move toward the pump. The axial bearing 22, 22a, 11 has no influence on the axial forces during movement of rotor 9 and shaft 3 with flange 22 toward the pump since the axial thickness of gap 22a increases.

When rotor 9 and shaft 3 are moved out of the central balanced position away from the pump, the pressure component R, and the opposite pressure component W are hardly influenced. No axial forces develop in the axial bearing 15, 15a, 12 since the thickness of gap 15a increases. Since the axial thickness of gap 22a is reduced by the movement of rotor 9 with shaft 3 away from the pump, axial forces develop in gap 22a which act on flange 22 to urge shaft 3 with rotor 9 toward the pump, and this force rapidly increases as the axial thickness of gap 22a is further reduced. When rotor 9 and shaft 3 move due to the action of this relieving force again away from the pump, the axial thickness of gap 22a increases, and the relieving force is reduced so that rotor 9 and shaft 3 tend to assume a counterbalanced central position.

The forces created in the gaps 22a and 15a when the thickness of the same is reduced, respectively can be additionally influenced by dimensioning the circumferential throttling gaps 13 and 20 and the flanges 15 and 22. The rotary flanges 15 and 22 have a layer of a low friction material which permits smooth sliding of the end faces of flanges 15 and 22 in end positions momentarily abutting the opposite faces of end walls 11 and 12. In order to permit a flow of cooling and lubricating fluid to bearings 16 and 21 even if gaps 15a and 22a have minimal thickness, it is advantageous to provide grooves in the outer surfaces of end walls 11 and 12 in the regions opposite flanges 15 and 22. Only when the axial forces fluctuate in an unusual manner, it may happen that the flanges 15 and 22, respectively, abut the outer faces of walls 11 and 12, and in this event the fluid can flow through the grooves in the end walls 11 and 12. In this manner, excessive wear of the lining of flanges 15 and 22 is prevented.

The motor and pump unit according to the invention has the advantage over the prior art that a stable counterbalancing of the axial pressures is obtained by a simple structure, and that the rotor of the unit automatically assumes a counterbalanced central position after a short axial oscillation. If the rotor is displaced from its normal central position by fluctuations of axial forces, even a small displacement results in very great counterbalancing forces which tend to move the rotor back to its central counterbalanced position. When the centrifugal pump and the motor are suitably designed, no load acts on the axial thrust bearings.

It will be understood that each of the elements described above, or two or more together, may also find a useful application in other types of hydraulic motor and pump units differing from the types described above.

While the invention has been illustrated and described as embodied in a counterbalanced motor and pump unit with shaft flanges forming axial gaps, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Counterbalanced hydraulic motor and pump unit comprising, in combination, a pump having a pump rotor; a motor including a stator casing having two end walls, a motor rotor in said stator casing and dividing the interior of the same into two spaces, one of said spaces being adjacent said pump and the other space being remote from said pump, a shaft fixedly connecting said pump rotor with said motor rotor, said end walls being formed with axially aligned openings through which said shaft passes so that circumferential gaps are formed around said shaft, said shaft having transverse bearing flanges located outside of said end walls, respectively, and forming with the same adjacent said circumferential gaps two annular axial gaps whose axial thicknesses simultaneously decrease and increase, respectively, when said motor rotor moves with said shaft in axial direction; a connecting conduit formed at least partly by said stator casing for connecting said two spaces; and conduit means for supplying pressure fluid from said pump into one of said spaces and for returning fluid to said pump from said spaces so that one part of the pressure fluid flows in outward axial direction through the circumferential and axial gaps located at one end of said stator casing to said pump, while another part of the pressure fluid flows in the opposite outward axial direction through said connecting conduit, the other space, and the circumferential and axial gaps at the other end of said rotor casing to said pump while the fluid pressures in said axial gaps counterbalance axial forces acting on said motor rotor and shaft.

2. Motor and pump unit as claimed in claim 1 wherein said conduit means include a return conduit in said shaft connecting said gaps at said other end with said pump.

3. Motor and pump unit as claimed in claim 1 wherein said circumferential gaps are bounded by circular rims of said end walls, said rims being spaced a small radial distance from the portions of said shaft located in said openings, so that said circumferential gaps act as throttles.

4. Motor and pump unit as claimed in claim 1 wherein said end walls are formed with grooves in the regions opposite said bearing flanges.

5. Motor and pump unit as claimed in claim 1 wherein said circumferential gaps are bounded by circular rims of said end walls, said rims being spaced a small radial distance from the portions of said shaft located in said openings, so that said circumferential gaps act as throttles; and wherein said end walls are formed with grooves in the regions opposite said bearing flanges.

6. Counterbalanced hydraulic motor and pump unit, comprising, in combination, a pump having a pump rotor; a motor including a motor rotor, a shaft fixedly connecting said pump rotor with said motor rotor and having two transverse bearing flanges, and a stator casing surrounding said motor rotor and having two end walls located on opposite sides of said motor rotor and formed with axially aligned openings through which said shaft passes so that circumferential gaps are formed around said shaft, said bearing flanges being located outside of said end walls, respectively, and forming with the same two annular axial gaps whose axial thicknesses simultaneously increase and decrease, respectively, when said motor rotor and said shaft move in axial direction; said motor rotor dividing said interior of said casing into two spaces, one of said spaces being adjacent said pump and the other space being remote from said pump, and forming an annular connecting gap with the inner surface of said stator; and conduit means supplying pressure fluid from said pump into said one space so that one part of said pressure fluid flows from said one space through the circumferential gap and the axial gap located adjacent said pump, while another part of said pressure fluid flows from said one space through said connecting gap, said other space, and the circumferential and axial gaps located remote from said pump for counterbalancing axial forces acting on said motor rotor and shaft.

7. Motor and pump unit as claimed in claim 6 wherein said casing has a casing portion forming a pressure chamber with the end portion of said shaft located remote from said pump and communicating with said other space through the respective circumferential and axial gaps whereby pressure is exerted in axial direction on said shaft counteracting the pressure exerted on said rotor by the pressure fluid in said one space and varying in accordance with the variations of the thicknesses of said axial gaps due to axial movements of said shaft and bearing flanges thereon.

8. Motor and pump unit as claimed in claim 7 comprising bearing means surrounding the end portions of said shaft axially outward of said end walls and bearing flanges, respectively, and forming with said end portions throttling gaps for said one part of said fluid flowing through the respective circumferential and axial gaps directly into said pump, and for said other part of said fluid flowing through the respective other circumferential and axial gaps into said pressure chamber; and wherein said shaft is formed with an axial bore opening into said pressure chamber and into said pump for returning said other part of said fluid to said pump.

9. Motor and pump as claimed in claim 8 wherein said circumferential gaps are bounded by circular rims of said end walls, said rims being spaced a small radial distance from the portions of said shaft located in said openings, so that said circumferential gaps act as throttles.

10. Motor and pump unit as claimed in claim 9 wherein said end walls are formed with grooves in the regions opposite said bearing flanges.

11. Motor and pump unit as claimed in claim 6 wherein said bearing flanges include layers confronting said end walls, respectively, and consisting of a wear-resistant smooth material.

* * * * *